June 21, 1966 H. I. GLASER 3,257,184
APPARATUS AND METHOD FOR PRODUCING FLAKE GLASS
Filed Oct. 18, 1961 3 Sheets-Sheet 1

INVENTOR.
HELLMUT I. GLASER
BY
ATTORNEYS

June 21, 1966  H. I. GLASER  3,257,184
APPARATUS AND METHOD FOR PRODUCING FLAKE GLASS
Filed Oct. 18, 1961  3 Sheets-Sheet 2

INVENTOR.
HELLMUT I. GLASER
BY
ATTORNEYS

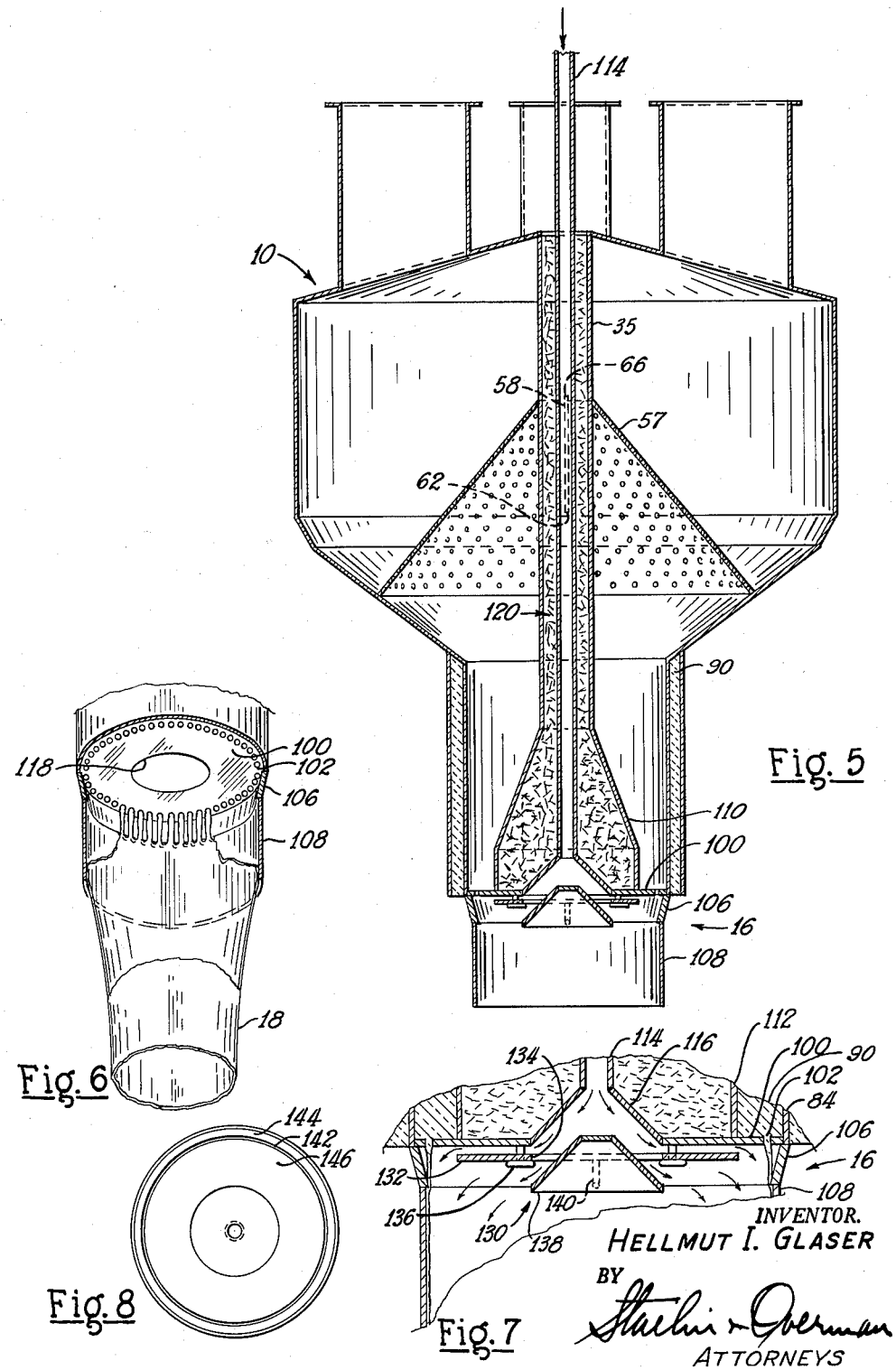

3,257,184
APPARATUS AND METHOD FOR PRODUCING
FLAKE GLASS
Hellmut I. Glaser, Anderson, S.C., assignor to Owens-Corning Fiberglas Corporation, a corporation of Delaware
Filed Oct. 18, 1961, Ser. No. 145,911
8 Claims. (Cl. 65—85)

This invention relates to an apparatus and method for producing glass films, and more particularly to an apparatus and method for producing glass films wherein just prior to forming, glass is heated to an elevated temperature to effect homogenization of both temperature and composition to provide uniform flow and to assure melting of all crystalline constituents whereby films of improved uniformity of thickness are formed.

Flake glass is a pulverulent material that is finding widespread use as an additive for synthetic resins, imparting novel and unique characteristics thereto as a result of its light-transmitting properties. It is also finding wide use as a reinforcement agent for a variety of materials including synthetic resins, papers, Portland cement and the like. Also, this unique material has interesting electrical resistance properties and thermal insulation properties, further extending its application.

When used as a reinforcing material, it is desirable that glass flakes have a high modulus of rupture, i.e. high strength. However, it has been found that high modulus glass compositions have extremely short working temperature ranges on the order of ±1° F. Accordingly, it will be readily evident that these glasses are extremely difficult to form into films because of the fact that they revert readily to a highly fluid condition at a hot spot in a feeder and thus either rupture the film or cause a film of variable thickness to be formed. Accordingly it has not been practical in the past to produce films and flakes from the high modulus compositions.

The high temperature insulation characteristics of flake glass have also come to attention, particularly when the flakes are made from glass compositions such as sodium silicate or the like which can be readily leached to remove the alkaline constituents and provide flakes of substantially pure silica. Pure silica withstands extremely high temperatures and its applications in the field of high temperature insulation are substantially limitless.

However, it is a characteristic of many of these leachable glasses that they, too, are difficult to form into films, requiring high melting temperatures where they become highly fluid. In view of this fact no practical apparatus or method has been provided in the past to form these glasses into films of extremely low thickness, on the order of microns, and also of a high degree of uniformity of thickness.

Accordingly, apparatus and method whereby these short working range and highly fluid glasses can be handled and successfully formed into thin films of a high degree of uniformity of thickness would provide a substantial advance in the art of flake glass manufacture.

Accordingly, it is an important object of the present invention to provide a novel melter for producing glass films of a high degree of uniformity of thickness from glasses of extremely short working temperature ranges.

It is a further object to provide a novel apparatus for producing films and flakes from short working range glasses wherein a premelting chamber is utilized to feed a temperature homogenization zone from which glass of homogenized, uniform temperature flows to a film-forming orifice.

A still further object is to provide a melter and feeder for producing film and flake from glasses of extremely short working temperature ranges wherein an electrically heated homogenization zone comprises a double walled structure containing a high density refractory therebetween to even out hot spots formed in the outer, heated wall and thus impart a uniform temperature to the glass retained by the inner wall.

A further object is to provide a melter and feeder for producing film and flake from glasses of extremely short working temperature ranges wherein the temperature of the glass is homogenized prior to being converted to film by the feeder so that a portion of the glass will not be rendered molten and flow as a liquid, whereas an adjacent portion at a very minute temperature differential would flow more slowly and thus provide a film of varying thickness; by the present invention a film of highly uniform thickness is produced from glasses of such a short working range that they revert from a viscous, workable state to a highly liquid non-workable state in a very short temperature range, as for example from 1 to 3 degrees.

A further object is to provide a method for producing films from heat-softenable materials wherein the material is heated substantially above its forming temperature, cooled as a moving layer to just above its film-forming temperature and then attenuated as a cylindrical layer into a film just after it is discharged into the surrounding ambient atmosphere for passage downwardly through the crystallization viscosity sufficiently rapidly to provide film formation without crystallization.

Another object is to provide apparatus for forming glass films, including a tubular lip or forming apron of sufficient length to cool molten glass passing thereover to just above the crystallization viscosity before it is discharged from the lip into the surrounding ambient atmosphere for attenuation into a film as the temperature is reduced through the crystallization viscosity sufficiently rapidly to prevent crystallization.

Other objects of this invention will appear in the following description and appended claims, reference being had to the accompanying drawings forming a part of this specification wherein like reference characters designate corresponding parts in the several views.

In the drawings:

FIGURE 5 is a longitudinal section view of the apparatus of invention;

FIGURE 6 is a fragmentary bottom perspective view of a preferred form of molten material feed aperture arrangement;

FIGURE 7 is an enlarged fragmentary section view of the forming apron end of the apparatus of FIGURE 5; and FIGURE 8 is a bottom plan view of an alternate form of molten material feeding orifice arrangement.

BRIEF PERSPECTIVE

Briefly the present invention provides an improved glass melter and feeder wherein glasses of extremely short working ranges, as for example plus or minus one degree, are passed through a narrow temperature homogenization zone wherein an extremely uniform temperature is imparted to the glass passing therethrough and wherein sufficiently high temperatures are provided for melting particles which would not otherwise be melted, and thereafter the glass is passed through a radiating apron for cooling to a desired working temperature range for film formation. Thus the components and the temperature of the glass may be homogenized at a level above the actual forming temperature by the configuration of the homogenization zone. Thereafter, the fluid glass is uniformly cooled to its working range for discharge into the surrounding ambient atmosphere for formation into films of improved uniformity of thickness without crystallization.

In accordance with the present invention, the novel melter and feeder is of circular configuration, lending improved facility to the production of a tubular envelope of glass as used in the formation of glass films for subsequent formation of glass flakes.

THE ENVIRONMENT

Figure 1:
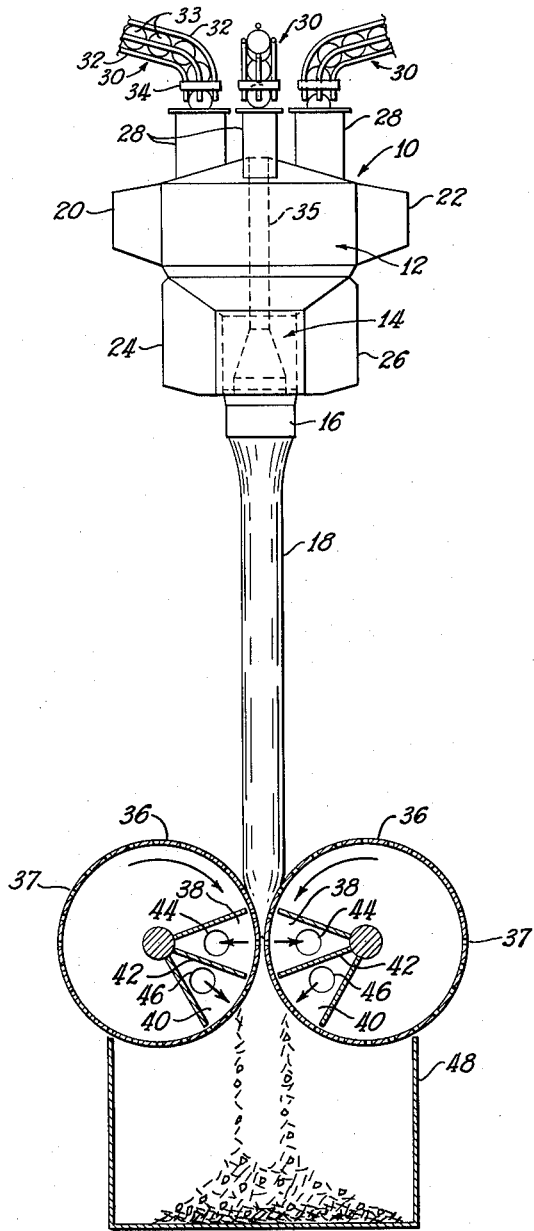
FIGURE 1 is a front view of apparatus used for the production of glass film and flakes, incorporating the present invention.
Figure 2:
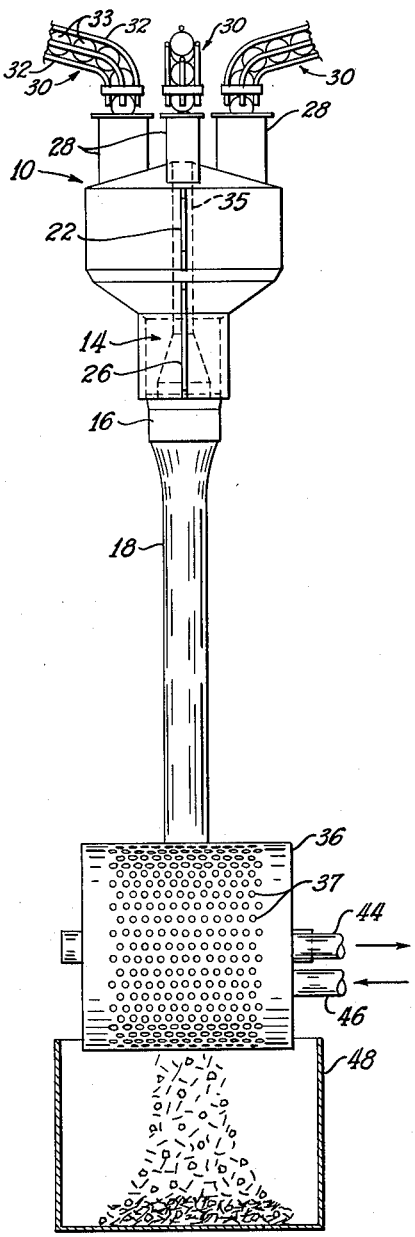
FIGURE 2 is a side view of FIGURE 1.

As shown in FIGURES 1 and 2, apparatus is illustrated which typically provides first the formation of glass films and then the fracturing of such films to produce flakes. The apparatus includes a melter-feeder 10 forming the subject of the present invention, which is of circular configuration and includes a premelt chamber 12 connected in fluid conducting relationship with a lower and important homogenization zone 14. Below the homogenization zone there is a delivery apron 16 and adjacent the lower end of the delivery apron, the formation of a tubular glass envelope 18, having a very low wall thickness, takes place. The bushing 10 is provided with a set of upper terminals 20, 22 and a lower set of terminals 24, 26. The terminals 20, 22 are spaced 180° apart on the outer periphery of the premelt chamber 12 and the terminals 24, 26 are aligned therebelow in connection with the homogenization zone 14. The bushing 10 is formed of platinum or a suitable alloy thereof and is fabricated by bending and welding techniques. On top of the melter-feeder 10, there are provided four feed conduits 28, spaced 90° apart. Above each of the feed openings 28 there is provided a hollow chute 30 that comprises a plurality of steel guide wires 32 arranged to form a tubular conduit with support rings 34 holding the steel guide wires 32 in properly oriented relationship. It will be noted that the guide wires 32 are spaced approximately 90° apart so that glass chips that may become broken from the marbles 33 will fall free and not jam in the chutes 30 and stop flow therethrough. The marble chutes 30 are connected with hoppers (not shown) positioned above the melter-feeder 10 on a suitable support floor and thus convey by gravity a constant flow of marbles into the melter-feeder. The melter-feeder is operated in a full condition and as glass is withdrawn from the bottom, the supply is automatically replenished.

The melter-feeder 10 is provided centrally with a gas conduit, to be described later, positioned within a centrally disposed tubular casing 35 extending the vertical length of the melter-feeder. The gas conduit is adapted to conduct gas into the interior of the tubular glass envelope 18 and thereby provide a suitable degree of inflation of the same.

The tubular glass envelope 18 issues downwardly by gravity to a pair of oppositely disposed and aligned pull cylinders 36, 36. The cylinders 36, 36 are rotatably journaled and driven for contra-rotation with their peripheries positioned in adjacent but non-contacting relationship so that the inflating gas may exhaust from the lower end of cylinder 18. The ends of the cylinders 36, 36 are closed and the peripheries are provided with apertures 37, FIG. 2, for the passage of gases. Interiorly of the cylinders 36, 36 as best shown in FIGURE 1, there are provided opposing suction boxes 38, 38 lying adjacent pressure chambers 40, 40 and being separated therefrom by common walls 42, 42. The suction boxes 38 are connected with exhaust conduits 44, FIGURE 2, which lead to an exhaust mechanism such as a pneumatic fan (not shown). The pressure chambers 40 are connected with inlet conduits 46 that connect to a gas pumping mechanism such as a fan (not shown).

As the tubular glass envelope 18 passes downwardly between the peripheries of the pull cylinders 36, 36, it first passes between the suction boxes 38, 38. Due to the fact that there is reduced pressure in each of the suction boxes, the opposing walls of the tubular glass envelope 18 are pressed against the peripheries of the pull cylinders in a grasping relationship whereby the turning movement of the pull cylinders is effective to pull the envelope downwardly and provide an attenuating force for its formation. As the envelope 18 passes beyond the axis of the pull cylinders 36, 36 its walls are separated into two very delicate films and one of these films becomes adhered to each of the cylinders 36, 36. As the films pass the common wall 42, 42 pressure developed within the chambers 40, 40 is effective to fracture the films into very small particles or flakes of glass. The flakes fall by gravity to a collection hopper 48. As the flake glass product accumulates in the collection hopper 48, it is periodically removed and packaged for shipment to consumers.

THE NOVEL MELTER-FEEDER

Figure 3:
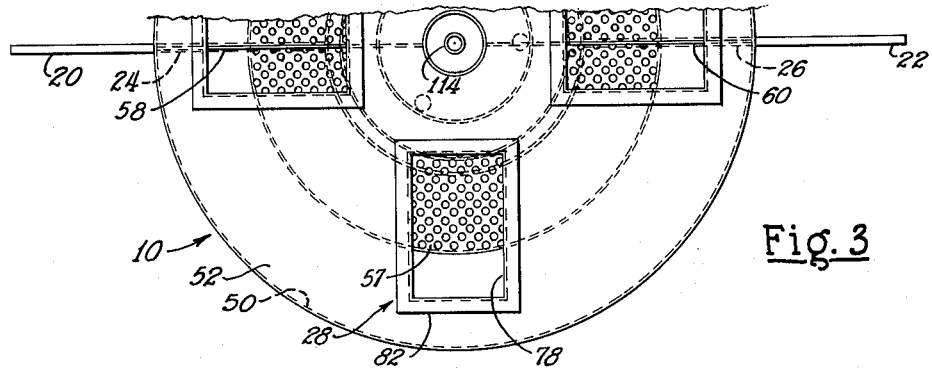
FIGURE 3 is a partial top plan view of the novel melter-feeder of the invention.
Figure 4:
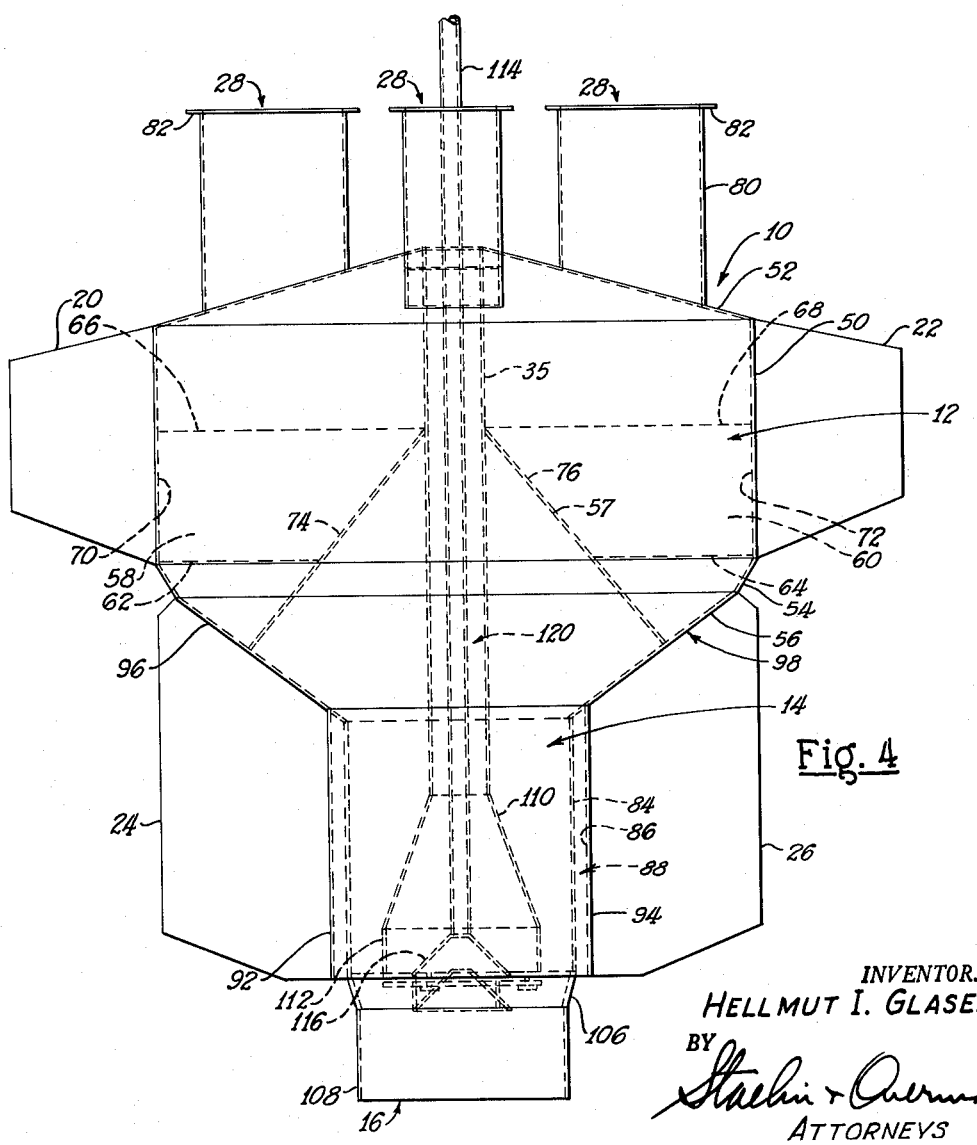
FIGURE 4 is a front elevational view of the apparatus of invention, internal parts being shown in dotted outline.

As best shown in FIGURES 3, 4 and 5, the melter-feeder 10 of the present invention is of circular configuration and includes a generally cylindrical premelt chamber 12 in the upper portion thereof, which is connected in fluid-conducting relationship to a subjacent and cylindrical homogenization chamber 14. The premelt chamber 12 includes a central, cylindrical wall 50 on top of which is positioned a generally flattened conical top 52. Beneath the central cylindrical wall 50 there is provided a first inverted truncated conical wall 54 that is joined at its upper edge to the base of the wall 50 and tapers inwardly and downwardly. Beneath the intermediate inverted truncated conical wall 54, there is provided a bottom inverted truncated conical wall 56 that is joined along its top edge to the bottom of the wall 54. The construction of the homogenization chamber 14 and the manner in which it is joined to the bottom edge of the wall 56 will be subsequently described. The premelt chamber 12 also includes 180° opposed terminals 20 and 22 of plate configuration and trapezoidal form, having their bases connected vertically to the wall 50, terminating at the upper and lower edges thereof.

Interiorly of the premelter 12 there is provided a perforated conical screen 57 having its base joined to an intermediate portion of the wall 56 and its top terminating medially of the wall 50 around the centrally disposed conduit 35. Also, positioned interiorly of the premelt chamber 12 and in alignment with the terminals 20 and 22, there are provided trapezoidal current-carrying strips 58 and 60. These strips 58 and 60 have their short parallel edges 62 and 64 extended between the wall 50 adjacent to the lower apexes of the terminals 20 and 22, and the upper, longer parallel edges 66 and 68 extended between the top of the cone 57 to the wall 50, being connected to the inside thereof opposite the medial portion of the terminals 20 and 22. The outer vertical edges 70 and 72 of strips 58 and 60 are welded along their entire lengths to the inside of the outer walls 50 in alignment with the terminals 20 and 22. The inner angular edges 74 and 76 of the strips 58 and 60 are connected along their lengths to the upper portion of the conical screen 57.

FUNCTION OF HEATER STRIPS AND PERFORATED CONE

As previously mentioned, the terminals 20 and 22 are adapted to be connected to a suitable source of electrical current for resistance heating. Since the outer wall 50 of the premelt chamber is of metal, it will form one electrically conducting path and heat the outside of a body of glass. To provide more uniform heating to the interior of the unit, current also flows through the plates 58 and 60.

The perforations of the screen 57 permit molten glass to flow downwardly; however, they retain unmelted glass marbles and particles from moving downwardly. Thus, only molten materials are permitted to flow into the homogenization chamber 14.

THE FEED OPENINGS

The flattened conical top 52 of premelt chamber 12 is provided with four rectangular openings 78, FIGURE 3, spaced 90° apart. This has been found to provide the most even heat pattern obtainable by electric current flowing through the top 52. To each of the rectangular openings 78 there is welded an upstanding feed conduit 28 as described with reference to FIGURES 1 and 2. These include body portions 80 of rectangular section, to the tops of which are mounted reinforcing flanges 82. The marble chutes 30, described with reference to FIGURES 1 and 2, are positioned above the conduits 28 to deliver marbles into the premelt chamber 12 by gravity flow.

THE HOMOGENIZATION CHAMBER

The homogenization chamber 14 includes an inner cylindrical wall member 84 that is joined at its upper edge to the bottom edge of the bottom inverted truncated conical wall 56 of premelt chamber 12. Positioned around and spaced outwardly from the wall 84, there is provided an outer wall 86 that is also connected to the wall 56 of premelt chamber 12 at a point spaced outwardly and upwardly from the connection for the top edge of inner wall 84. It will be observed that a space 88 of annular configuration is formed between the walls 84 and 86 and this space is filled with a high density refractory material 90, FIGURE 5, such as castable zircon which displays a high K value or high thermal conductivity.

The electrical terminals 24 and 26, previously mentioned in the description of FIGURES 1 and 2, are of plate configuration and of trapezoidal shape with the short parallel sides 92 and 94 extending the length of the outer wall 86 and secured by welding. The terminals 24 and 26 are spaced 180° apart and are aligned beneath the terminals 20 and 22 of the premelt chamber 12. The angularly disposed edges 96 and 98 of the terminals 24 and 26 are fastened to the bottom wall 56 of premelt chamber 12. It will be noted that the upper apexes of the terminals 24 and 26 terminate at the line of joinder between walls 54 and 56, and carry current through the bottom part of the premelt chamber and through the outer wall of the homogenization chamber 14.

The homogenization chamber 14 is closed at the bottom by an annular plate 100, FIGURES 5 and 6, that is welded at its outer periphery to the inside bottom edge of the inner wall 84.

THE DELIVERY ORIFICES AND FEED APRON

Spaced inwardly a short distance from the outer periphery of the annular bottom plate 100 there is provided a ring of molten glass feeding openings 102.

The feed apron 16, formerly referred to in describing FIGURES 1 and 2, comprises an upper, short inverted truncated conical wall 106 with its upper edge welded to the bottom edge of the inner wall 84 of the homogenization chamber 14. This upper wall 106 tapers inwardly and downwardly and terminates at its bottom edge in exact alignment with the ring of molten glass feed openings 102. Secured to the bottom edge of the wall 106 is a cylindrical wall 108 with its inner surface positioned to receive glass flowing vertically from the orifices 102.

The configuration of the feed apron 16 and its relationship with the feed orifices 102 is provided so that droplets of highly fluid glass from the feed orifices can be caught and spread into a film instead of contaminating the envelope 18.

THE INFLATING GAS CONDUIT

The centrally disposed tubular casing 35 is connected at its top end to an opening provided centrally of the flattened conical top 52 of premelt chamber 12.

At its bottom end the casing 35 flares outwardly as an inverted truncated conical wall portion 110 which joins at its lower end with a vertically extending cylindrical wall portion 112 that is joined at its lower edge to the upper surface of the annular bottom plate 100 as best shown in FIGURE 7.

A gas inlet tube 114 of lesser diameter than the casing 35 is positioned coaxially of the casing 35, and extends downwardly to about the top edge of the vertically extending cylindrical wall 112 where it flares outwardly as an inverted truncated conical wall 116 which is joined at its bottom edge to the periphery of the circular opening, formed in the center of annular bottom plate 100, the joinder being best shown in FIGURE 7. In order that the gas passing downwardly through inlet tube 114 will not be in heat-exchange relation with the glass being melted in the premelt chamber 12 and in the homogenization chamber 14, powdered alumina insulation or its equivalent is used to fill the annular chamber 120 between gas inlet tube 114 and casing 35.

As best shown in FIGURE 7, the gas flowing downwardly through inlet tube 114 is evenly distributed within the delivery apron 16 by a distributor baffle assembly 130. The baffle assembly 130 includes an annular plate 132 of lesser outside diameter than wall 106, and is provided with a centrally disposed circular opening 134 of substantially the same diameter as the opening of annular bottom plate 100. The annular plate 132 is provided with appropriate holes through which headed support pins 136 are passed with the heads underneath the plate 132 and the upper ends fasened to the bottom plate 100. The pins 136 are of a length to space the plate 132 downwardly a short distance from bottom plate 100.

Within the opening 134 of annular plate 132, there is positioned an inverted truncated conical baffle 138 which has support wires 140 fastened to its upper surface adjacent to its lower edge. These wires 140 extend vertically upwardly to the inside edge of the opening 134. All parts of the distributor baffle assembly 130 are held in fixed relationship with each other by small, neat welds, not shown.

From the foregoing it will be observed that gas passing downwardly within tube 114 can flow over the top of the plate 132 and beneath the annular bottom plate 100. Also, the incoming gas can flow downwardly over the top of the conical baffle 138 positioned within opening 134 of plate 132.

FUNCTION OF THE APPARATUS

When electric current is directed into the premelt chamber 12 by means of the terminals 20 and 22, the walls 50 and 54, the top 52, the heater strips 58 and 60 and the upper portion of the perforated conical screen 57, by their resistance, are heated to melt glass marbles admitted through the feed conduits 28. As the marbles melt and are converted into molten glass, the molten glass passes through the openings of the perforated conical screen 57 and downwardly into the upper part of the homogenization chamber 14.

Current is directed into the homogenization chamber 14 through the terminals 24 and 26 and is effective to heat the outside wall 86 of the homogenization chamber 14 and the lower wall 56 of premelt chamber 12. Inasmuch as the present invention is specifically designed to handle glasses having a very short working temperature range, it is highly important that the temperature of the glass be absolutely uniform before it passes out through the feed orifices 102. Therefore, the refractory material 90 in the space 88 between the inner and outer walls of the homogenization chamber 14 evens out any hot spots caused by current concentrations in the outer wall 86. Thus the heat travelling through the refractory 90 is spread and evenly distributed for absolutely uniform radiation into the glass from the inner wall 84.

DWELL ZONE FOR CRYSTAL SOLUTION

It will be noted that the upper part of the homogenization chamber 14 is of larger volume than the bottom part, thus providing a dwell zone for crystal solution and refining of the glass. It is noted that the lower portion of the temperature homogenization chamber 14 is very narrow whereby the glass passing therethrough is evenly subjected to heat of a highly uniform character so that all of the glass at the instant it passes through the openings 102 is of absolutely the same temperature.

As the glass flows through the openings 102, as shown in FIGURE 7, it may be so fluid and of such surface tension to form separate streams or in some cases even droplets. These fall to the top of the cylindrical wall 108 of delivery apron 16, as shown in FIGURE 6. Because the holes 102 and the streams issuing therefrom are spaced so closely together, the streams striking the top of the wall 108 spread to form a uniform film on the wall 108 that issues downwardly from the bottom thereof as the tubular glass envelope 18.

In addition to its function of creating a uniform film of glass from a plurality of highly fluid streams, the apron 16 forms the molten glass into a tubular layer that radiates heat to the atmosphere through the wall 108 and thus the molten glass is uniformly cooled as it flows downwardly. Accordingly, the apron or forming lip 16 cooperates with the homogenization zone in a very effective manner. By cooling the glass, as it passes down the wall 108, it is possible by the present invention to actually heat the glass above its forming temperature into a liquid state in the homogenization zone to provide better homogenization of temperature and also to melt particles such as crystals which would not otherwise be melted. Thus, by the present invention, the glass can be heated above its forming temperature and then cooled by controlled radiation from wall 108 to its forming temperature at the point just before it issues downwardly from the bottom edge of the wall 108 into the surrounding ambient atmosphere. Upon discharge from the lip or apron 16 the glass is then lowered in temperature through the crystallization viscosity sufficiently rapidly to permit formation of the glass into a cylindrical film without crystallization.

In retrospect, therefore, it will be understood that the present melter-feeder provides a highly uniform heat pattern to provide improved uniformity of heating for glasses having a very short working range and for the controlled cooling of such glasses to their forming temperature for film formation without crystallization.

SPECIFIC EXAMPLE

Utilizing the above-described melter-feeder, a glass film of a high degree of uniformity of thickness of a few micons was produced from the following high modulus glass composition that had a forming temperature range of ±1° F.

| | Percent by weight of batch |
|---|---|
| $SiO_2$ | 53.73 |
| CaO | 12.94 |
| MgO | 8.96 |
| BeO | 7.96 |
| $ZrO_2$ | 1.99 |
| $TiO_2$ | 7.96 |
| $Li_2O$ | 2.99 |
| $Fe_2O_3$ | 0.5 |

Operating data for the run were as follows:

Forming temperature range _____ 2235±1° F.
Forming dwell time _____ 9 min.
Refining temperature _____ 2450±15° F.
Refining dwell time _____ 21 min.
Melting temperature _____ 2400±25° F.
Melting dwell time _____ 68 min.
Total residence time _____ 98 min.
Glass volume in melter _____ 5.7 lb. or 55.03 in.³
Glass volume in forehearth ____ 1.72 lb. or 16.86 in.³
Glass volume in bushing _____ 0.77 lb. or 7.48 in.³

EXTENDED SCOPE OF THE INVENTION

Although the melter-feeder of the present invention is particularly applicable to the processing of glasses having extremely short working temperature ranges, it is also adapted to be used with broader working range glasses. Accordingly, as shown in FIGURE 8, an alternate embodiment of the bottom plate 100 of homogenization chamber 14 is illustrated. This design is particularly adapted to facilitate the formation of films from glasses having higher surface tension at elevated temperatures, which would prevent them from spreading into a uniform film from spaced apertures, as indicated at 102 in FIGURE 6. Thus, if glasses having higher surface tensions were fed through spaced apertures, as in FIGURE 6, streaking would be a problem and an uneven wall thickness and surface would be produced in the envelope 18.

Accordingly it is to be considered within the scope of the invention to utilize an annular opening 142 in place of the ring of apertures 102. In this aspect of the invention, the bottom of the homogenization chamber includes an outer annular plate 144 connected at its outer edge to the bottom of the inner wall 84 of homogenization chamber 14, and an inner annular plate 146 with its outer periphery spaced inwardly a short distance from the inner periphery of the outer plate 144 and its inner periphery fastened to the truncated conical wall 116 of gas inlet tube 114. In this aspect of the invention it is highly important, for uniform wall thickness of the tubular glass envelope 18 that the annular opening 142 be uniform. This means that the inner annular plate 146 and the outer annular plate 144 must be spaced exactly from each other at all points. For this purpose, centering members would be positioned between the inside wall 84 of homogenization chamber 14 and the wall 110 or 112 of central casing 35.

Although the foregoing description has related to the use of a castable zircon as a heat distribution agent to fill the space 88 between the inner and outer walls 84 and 86 of the homogenization chamber 14, it is to be included within the scope of the invention to utilize other equivalent materials. One material which would be applicable to use would include mullite.

Although the foregoing specification has referred to powdered alumina as an insulator to fill the annular chamber 120 between the central casing 35 and the gas inlet 114, it is to be included within the scope of the invention to use other equivalent insulations of low K factor. As an example of one other material which fulfills these requirements, powdered magnesia (MgO) is mentioned.

Although not shown in the drawings, it is also to be included within the scope of the invention to apply supplemental cooling to the wall 108 of delivery apron 16. By so operating, the length of the wall 108 can in effect be extended, which would be the equivalent of having more radiating surface on the wall 108. In this regard, it is also to be noted that application of supplemental cooling to the wall 108 could be used to change the surface tension characteristics and thereby even out ripples that would be formed by glasses of high surface tension passing through spaced apertures 102 as in FIGURE 6.

It is also to be included within the scope of the invention to utilize glasses of wider working ranges therein. By this invention these wider working range glasses can be heated to temperatures well above their working ranges to improve homogeneity of temperature and composition, and then accurately reduced to their working ranges. By so operating, improved flake thickness is provided since an envelope wall of improved uniformity is produced.

ADVANTAGES OF THE PRESENT INVENTION

From the foregoing it will be observed that the present invention provides for the formation of highly uniform films of extremely low thickness from glasses having extremely short working temperature ranges. Thus, such glasses can be heated to temperatures above their working range where they become highly fluid and thus of uniform temperature and free from crystals. If, because of their low surface tension, droplets instead of streams be formed, provision is made for distributing the droplets as a uniform film and reducing the temperature of the glass to its working range just before it leaves the delivery apron 16. Accordingly, by the present invention glasses of extremely short working temperature ranges such as a high modulus glass can be filmed for making flakes of extremely high strength for reinforcement of synthetic resins.

It is more importantly a feature of the present invention that the circular homogenization chamber eliminates hot spots caused by stray currents.

Also, broadly the present invention is adapted to provide more accurate and improved control with any highly fluid glass. Thus, it is also an important aspect of the invention that highly fluid glasses such as sodium silicate can be filmed, so that the flakes produced therefrom can be leached to produce substantially pure silica flakes.

By the present invention sodium silicate can be formed into flakes because the invention provides extremely high temperature melting and a fast temperature drop to the working range with good control over the forming section.

USES OF FLAKES MADE IN ACCORDANCE WITH THE PRESENT INVENTION

The high modulus flakes adapted to be produced from highly fluid glasses in accordance with the present invention can be used to reinforce plastics to provide high strength laminates.

The high silica glass flake products, as produced from high silica glass compositions, including sodium silicate, can also be used in products not requiring a water lubricant, recognizing that water would be detrimental to any sodium silicate glass product because of high water solubility of the sodium silicate.

Also, the readily leachable flakes, such as those produced from sodium silicate, can be leached to provide substantially pure silica flakes. These high silica flakes are adapted to the production of improved, high temperature insulation.

I claim:
1. In a method of forming a glass film from glass containing the following batch ingredients:

| | Percent by weight of batch |
|---|---|
| $SiO_2$ | 53.73 |
| CaO | 12.94 |
| MgO | 8.96 |
| BeO | 7.96 |
| $ZrO_2$ | 1.99 |
| $TiO_2$ | 7.96 |
| $Li_2O$ | 2.99 |
| $Fe_2O_3$ | 0.5 | the steps of heating said glass to a temperature in the range of 2400±25° F. to provide a molten body, issuing molten glass downwardly from said body as an endless layer, gradually reducing the cross sectional layer of said layer while simultaneously heating all segments to the same temperature in the range of 2450±15° F. to render the glass highly fluid and thereby homogenize the temperature and melt all crystalline constituents, reducing the thickness while simultaneously cooling said layer to 2235±1° F., and attenuating into a film.

2. In a melter-feeder for producing glass films,
a pre-melt chamber having an endless wall of temperature-resistant metal,
means for passing electric current through said wall to heat the same to glass-melting temperatures,
means for feeding glass materials to said pre-melt chamber,
a chamber below said pre-melt chamber and connected in fluid-conducting relationship thereto,
said chamber having inner and outer endless walls in coaxial alignment to form an annular space therebetween,
a dense refractory of high thermal conductivity filling said annular space,
said walls being formed of temperature-resistant metal,
means for passing electric current through said outer wall to heat the same to glass melting temperatures,
a tubular casing supported coaxially in said lower chamber defining an enlarged annular dwell and refining zone in the upper part and an annular temperature homogenization zone of lesser volume and smaller cross-section in the lower part,
a bottom on said chamber,
a circular orifice in said bottom,
and a cylindrical forming apron supported in fluid glass receiving relationship to said orifice,
whereby said outer wall is heated and the heat produced is uniformly distributed by said dense refractory and conducted to said inner wall to be uniformly distributed into said dwell and homogenization zones to heat molten glass therein above forming temperatures, to refine the glass and homogenize the temperature just before it flows through said feeding orifice and onto said forming apron.

3. In a melter-feeder for producing film from heat-softenable material,
a pre-melt chamber having a wall of temperature-resistant metal,
means for passing electric current through said wall to heat the same to softening temperature of said material,
means for feeding said material to said pre-melt chamber,
a homogenization chamber below said pre-melt chamber and connected in fluid-conducting relationship thereto,
said homogenization chamber having inner and outer endless walls in coaxial alignment to form an annular space therebetween,
said walls being formed of temperature-resistant metal,
terminals connected to said outer wall to conduct electric current through said wall to heat the same to melting temperature of said material,
refractory of high thermal conductivity filling said annular space,
an orifice at the bottom of said homogenization chamber,
and a forming apron supported in fluid-receiving relationship to said feeding orifice.

4. In a melter-feeder for producing film from heat-softenable material,
a pre-melt chamber having a wall of temperature-resistant metal,
terminals connected to said wall to conduct electric current therethrough to heat the same to melting temperature of said material,
means for feeding said material to said pre-melt chamber,
a homogenization chamber below said pre-melt chamber and connected in fluid-conducting relationship thereto,
said homogenization chamber having spaced inner and outer endless walls in coaxial alignment, forming an annular space therebetween,
said walls being formed of temperature-resistant metal,
high density refractory of high thermal conductivity filling said annular space,
an orifice at the bottom of said homogenization chamber, and terminals connected to said outer wall to conduct current therethrough to heat the same to melting temperature for said material.

5. In a melter-feeder for producing film from heat-softenable material,
a pre-melt chamber having a wall of temperature-resistant metal,
means for passing electric current through said wall to heat the same to melting temperature for said material,
means for feeding said material to said pre-melt chamber,
a homogenization chamber below said pre-melt chamber and connected in fluid-conducting relationship thereto,
said homogenization chamber having inner and outer endless walls in coaxial alignment to form an annular space therebetween,
a dense refractory of high thermal conductivity filling said annular space,
said walls being formed of temperature-resistant metal,
means for passing electric current through said outer wall to heat the same to melting temperature for said material,
a tubular casing positioned coaxially in said homogenization chamber defining annular dwell and temperature homogenization zones in the upper and lower parts thereof,
an annular bottom plate in said homogenization chamber having a circular orifice adjacent the outer periphery and a coaxial, circular opening in the center,
a conduit within said casing and connected with said circular opening,
means thermally isolating said conduit from said casing,
and a cylindrical forming apron connected to said bottom in fluid-receiving relationship to said orifice.

6. In a melter-feeder for producing film from heat-softenable material,
a pre-melt chamber having a wall of temperature-resistant metal,
means for heating said wall to melting temperature of said material,
means for feeding said material to said chamber,
means within said chamber preventing the passage of unmelted material therethrough,
a homogenization chamber below said pre-melt chamber and connected in fluid-conducting relationship thereto,
said homogenization chamber having inner and outer endless walls in coaxial alignment, forming an annular space therebetween,
a dense refractory of high thermal conductivity filling said space,
said walls being formed of temperature-resistant metal,
means for heating said outer wall to melting temperature of said material,
a generally tubular casing supported coaxially in said homogenization chamber defining annular refining and temperature homogenization zones in the upper and lower parts,
a bottom plate on said homogenization chamber and having a feed orifice adjacent the periphery,
said bottom plate also having an opening centrally thereof,
a conduit positioned within said casing and connected to said central opening,
thermal insulation between said conduit and said casing,
and gas distributing baffle means supported by said bottom plate beneath said central opening.

7. In a method of forming a glass film,
the steps of
providing a body of molten glass,
feeding downwardly an increment of molten glass from said body as a peripherally endless layer of substantial cross sectional area,
radiating heat into all parts of said endless layer to heat the same to a temperature above the working range to melt crystalline particles and refine the glass,
then reducing the cross sectional area of said endless layer while continuing the downward movement and diffusing additional heat uniformly into the layer, bringing all segments of said layer to substantially the same temperature, well above forming temperature,
issuing said layer downwardly as a plurality of small streams positioned in circular alignment,
blending said streams into a tubular layer of substantially lesser thickness,
cooling said tubular layer to working range,
and then attenuating said layer to a film in the forming temperature range.

8. In apparatus for forming a film of heat-softenable material,
a melting chamber adapted to produce a peripherally endless supply of molten material having all portions heated uniformly to a temperature above the forming temperature,
ring-like orifice means in said melting chamber adapted to issue said molten material from said peripherally endless supply,
a tubular apron of thin, heat-conductive material exposed directly to the ambient atmosphere to radiate heat, and connected to said melting chamber adjacent to said orifice means to receive molten material from said orifice means as a thin layer flowing in free-flow relationship over a surface thereof,
said apron being of sufficient length to radiate heat from said layer of molten material to reduce the material to a temperature and viscosity just above the liquidus temperature just prior to discharge from said apron,
and means for attenuating said heat-softenable material into a tubular film just after discharge from said apron and into the ambient atmosphere.

References Cited by the Examiner

UNITED STATES PATENTS

| 1,926,905 | 9/1933 | Le Coultre | 65—86 X |
| 2,186,718 | 1/1940 | Ferguson | 65—327 X |
| 2,569,459 | 10/1951 | De Voe | 65—134 |
| 2,577,213 | 12/1951 | Slayter et al. | 65—134 |
| 2,780,889 | 2/1957 | Fulk | 65—32 X |
| 2,926,208 | 2/1960 | Eden | 65—135 X |
| 2,978,341 | 4/1961 | Bastian et al. | 106—52 X |
| 3,078,695 | 2/1963 | Kozak et al. | 65—183 |

DONALL H. SYLVESTER, *Primary Examiner.*

P. GOLDSTEIN, R. L. LINDSAY, *Assistant Examiners.*